(12) United States Patent
Imai et al.

(10) Patent No.: US 6,505,091 B1
(45) Date of Patent: Jan. 7, 2003

(54) METHOD AND APPARATUS FOR ELECTRODISCHARGE MACHINING

(75) Inventors: Yoshihito Imai, Tokyo (JP); Takayuki Nakagawa, Tokyo (JP); Takashi Yuzawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/462,687

(22) PCT Filed: Nov. 5, 1999

(86) PCT No.: PCT/JP99/02412

§ 371 (c)(1),
(2), (4) Date: Mar. 21, 2000

(87) PCT Pub. No.: WO99/58279

PCT Pub. Date: Nov. 18, 1999

(30) Foreign Application Priority Data

May 12, 1998 (JP) .............................. 10-128821

(51) Int. Cl.[7] .............................. G06F 19/00; B23H 1/02

(52) U.S. Cl. ..................... 700/162; 700/176; 219/69.16

(58) Field of Search .............................. 700/162, 175, 700/176, 54, 55; 219/69.12, 69.13, 69.16, 69.17, 69.2; 324/452

(56) References Cited

U.S. PATENT DOCUMENTS

| | | | | |
|---|---|---|---|---|
| 4,864,091 A | * | 9/1989 | Boccadoro | 219/69.16 |
| 4,983,800 A | * | 1/1991 | Taneda | 219/69.16 |
| 5,676,860 A | * | 10/1997 | Muro et al. | 219/69.16 |
| 5,973,498 A | * | 10/1999 | Imai et al. | 324/452 |
| 6,028,282 A | * | 2/2000 | Toyonaga et al. | 219/69.12 |

FOREIGN PATENT DOCUMENTS

| | | |
|---|---|---|
| JP | 5293714 | 11/1993 |
| JP | 9248717 | 9/1997 |

OTHER PUBLICATIONS

Mechanism Of Electric Discharge Machining And How To Make Full Use Of It, Published by Gijutsu Hyoron–sha, Oct. 20, 1979, pp. 1–5 of partial translation.

\* cited by examiner

*Primary Examiner*—Leo Picard
*Assistant Examiner*—Steven R. Garland
(74) *Attorney, Agent, or Firm*—Leydig, Voit & Mayer, Ltd.

(57) ABSTRACT

A detected value indicating a machining state is filtered and a machining gap between an electrode and a workpiece is adjusted by using a control variable obtained through the filtering. Therefore, machining speed can be improved by maintaining a stable machining state through suppression of a disturbance in a gap distance control system due to eccentricity of an electrode, due to fluctuations in electric characteristics at feeding brush sections, and due to mechanical resonance of the electrode driving system.

11 Claims, 19 Drawing Sheets

METHOD AND APPARATUS FOR ELECTRODISCHARGE MACHINING

TECHNICAL FIELD

The present invention relates to an electric discharge machining control method and an electric discharge machining control device in which an electrode and a workpiece are placed in a machining liquid, a voltage is applied between the electrode and the workpiece, and the workpiece is machined with the generated electric discharge.

BACKGROUND ART

In an electric discharge machine, an electrode and a workpiece are placed in a machining liquid, a voltage is applied between the electrode and the workpiece, and the workpiece is machined with the generated electric discharge. A gap distance control system for adjusting the distance between the electrode and the workpiece is provided in the electric discharge machine that maintains a stable machining state. FIG. 16 shows the configuration of a machining control system including the conventional gap distance control system. This configuration is described, for example, on p88 to p90 of "Mechanism of Electric Discharge Machining and How to Make Full Use of It" (published by Gijutsu Hyoron-sha). As shown in this figure, designated at the reference numeral 101 is an electric discharge machining process, at 102 a machining-state detecting section, at 104 a reference-value setting section, at 105 an error-signal computing section, at 106 a control variable computing section, at 107 a machining-trajectory setting section, at 108 a rotational condition setting section, at 109 an electrode driving unit, at 110 a machining-pulse condition setting section, and at 111 a machining power unit. Designated at the reference sign y is a quantity of state in the electric discharge machining process 101, at ym a detected value of the quantity of state y detected by the machining-state detecting section 102, at r a reference value of a machining state set in the reference-value setting section 104, at e an error signal computed from the detected value ym and the reference value r by the error-signal computing section 105, at Rv a machining-trajectory instruction value set in the machining-trajectory setting section 107, at Rr a rotation instruction value set in the rotational condition setting section 108, at Up is a control variable computed from the error signal e and the machining-trajectory instruction value Rv by the control variable computing section 106, at Mp an electrode moving quantity operated according to the control variable Up and the rotation instruction value Rr by the electrode driving unit 109, at Rs a machining-pulse condition instruction value set in the machining-pulse condition setting section 110, and at Ms a machining pulse quantity operated according to the instruction value Rs by the machining power unit 111. It should be noted that the machining-trajectory instruction value Rv and the control variable Up are a vector variable corresponding to XYZ axes, the rotation instruction value Rr is a vector variable corresponding to a rotating speed and direction around a C axis. The electrode driving unit 109 consists of an XYZ-axial driving unit and a C-axial rotating unit, and controls a gap distance in the XYZ-axial direction while rotating the electrode in the C-axial direction according to the electrode moving quantity Mp. In addition, the machining-pulse condition instruction value Rs consists of an open voltage, a peak current, a pulse-ON time, and a pulse-OFF time, or the like.

FIG. 17 shows the operation of the conventional gap distance control system. A gap distance control algorithm is generally executed through software-processing by a microcomputer, and this figure shows a k-th processing. The processing in Step S201 is performed in the machining-state detecting section 102 and in this step a machining state of the electric discharge machining process as, for instance, an average gap voltage ym (k) is detected. The processing in Step S401 is performed in the error-signal computing section 105 and in this step an error signal e (k) from the reference value r and the detected value ym (k) of the average gap voltage is computed. The processing in Step S1701 is performed in the control variable computing section 106 and in this step a control variable Up (k) from the machining-trajectory instruction value Rv set in the machining-trajectory setting section 107 and the error signal e (k) is calculated. Further, the control variable computing section 106 gives the control variable Up (k) to the electrode driving unit 109. Here, Kp is a proportional gain and Ki is an integral gain. The electrode is then moved in such a manner that the detected value ym (k) coincides with the reference value by using the well-known PI compensation (proportional & integral compensation).

FIG. 18 shows a power spectrum of a detected value indicating a machining-state in the conventional gap distance control system. Namely, this figure shows the power spectrum P of an average gap voltage ym (k) detected by the machining-state detecting section 102 when machining is executed by the electric discharge machine having the conventional gap distance control system. As can be seen in this figure, the power spectrum shows peaks at frequencies $f_1$, $f_2$, and $f_3$. These peaks correspond to rotational frequencies of the electrode and the harmonic of the frequencies. The peaks in the power spectrum are derived from eccentric of the electrode to be rotated as well as from fluctuations in electric characteristics at the feeding brush section. FIG. 19 shows a power spectrum of a machining-state detected value in another electric discharge machine using the conventional gap distance control system. Namely, this figure shows a power spectrum P of an average gap voltage ym (k) detected by the machining-state detecting section 102 when machining is executed by another electric discharge machine having the conventional gap distance control system. When compared with FIG. 18, a new peak appears at the frequency $f_4$. This is a resonance frequency of the mechanical system of the XYZ-axial driving unit. Therefore, if the mechanical system has many resonance frequencies then peaks corresponding to each resonance frequency appear in the power spectrum. As described above, the presence of peaks in the power spectrum of the detected average gap voltage indicates the fact that there exists disturbance to the gap distance control system at the frequency corresponding to each peak. A stable machining state cannot be maintained at such frequencies where a peak is present.

As described above, for machining using a rotated electrode, eccentric of the electrode varies a gap distance, which disturbs the gap distance control system and deteriorates the machining speed. In addition, rotation of the electrode fluctates the electric characteristics at feeding brush sections, because machining current is fed from a machining power unit to the electrode through the feeding brush sections, which disturbs the gap distance control system and deteriorates the machining speed. Further, when there is mechanical resonance in the electrode driving unit, a control variable to the driving unit and an actual movement of an electrode are different, which results into an inappropriate control of the gap distance and deteriorates the machining speed.

DISCLOSURE OF THE INVENTION

A first electric discharge machining control method according to the present invention comprises the steps of detecting a machining state, filtering a detected value indicating the machining state with a notching frequency, computing an error signal from an output value by means of filtering and a set value of a machining state, computing a control variable for controlling movement of an electrode from the error signal and a set movement value of the electrode, and moving the electrode in a specific direction and at the same time rotating the electrode vertical to the opposite surface to a workpiece according to the control variable. With those operations, disturbance to a gap distance control system can be suppressed. Therefore, machining speed can be improved by maintaining a stable machining state.

In a second electric discharge machining control method according to the present invention, a notching frequency is adjusted according to a rotational frequency of an electrode or to a mechanical resonance frequency of a driving system for moving and rotating the electrode. With those operations, disturbance to a gap distance control system due to eccentric of an electrode as well as to fluctuations in electric characteristics can be suppressed. Therefore, machining speed can be improved by maintaining a stable machining state.

A third electric discharge machining control method according to the present invention comprises the steps of detecting a machining state, computing an error signal from a detected value indicating the machining state and a set value of a machining state, computing a control variable for controlling movement of an electrode from the error signal and a set movement value of the electrode, computing a correction for reducing an eccentricity of the electrode, compensating the control variable according to the correction, and moving the electrode in a specific direction and at the same time rotating the electrode vertical to the opposite surface to a workpiece according to the compensated control variable. With those operations, disturbance to a gap distance control system due to eccentric of an electrode as well as to fluctuations in electric characteristics can be suppressed. Therefore, machining speed can be improved by maintaining a stable machining state.

A fourth electric discharge machining control device according to the present invention comprises a machining-state detecting section for detecting a machining state, a notch filter section for filtering a detected value in the machining-state detecting section, an error-signal computing section for computing an error signal from an output value from the notch filter section and a set value of a machining state, a control variable computing section for computing a control variable for controlling movement of an electrode from the error signal and a set movement value of the electrode, and an electrode driving section for moving the electrode in a specific direction and at the same time rotating the electrode vertical to the opposite surface to a workpiece according to the control variable outputted from the control variable computing section. With those operations, disturbance to a gap distance control system can be suppressed. Therefore, machining speed can be improved by maintaining a stable machining state.

A fifth electric discharge machining control device according to the present invention further comprises a notching-frequency self adjustment section for adjusting a notching frequency according to a rotational frequency of an electrode or to a mechanical resonance frequency of a driving system for moving and rotating the electrode. With those operations, disturbance to a gap distance control system due to eccentric of an electrode as well as to fluctuations in electric characteristics at feeding brush sections can be suppressed. Therefore, machining speed can be improved by maintaining a stable machining state.

A sixth electric discharge machining control device according to the present invention comprises a machining-state detecting section for detecting a machining state, an error-signal computing section for computing an error signal from a detected value in the machining-state detecting section and a set value of a machining state, a control variable computing section for computing a control variable for controlling movement of an electrode from the error signal and a set movement value of the electrode, a correction computing section for computing a correction for reducing an eccentricity of the electrode, a control variable compensating section for compensating the control variable from the control variable computing section according to the correction from the correction computing section, and an electrode driving section for moving the electrode in a specific direction and at the same time rotating the electrode vertical to the opposite surface to a workpiece according to the compensated control variable. With those operations, disturbance to a gap distance control system due to eccentric of an electrode as well as to fluctuations in electric characteristics at feeding brush sections can be suppressed. Therefore, machining speed can be improved by maintaining a stable machining state.

BEST MODE FOR CARRYING OUT THE INVENTION

First Embodiment

Figure 1A:
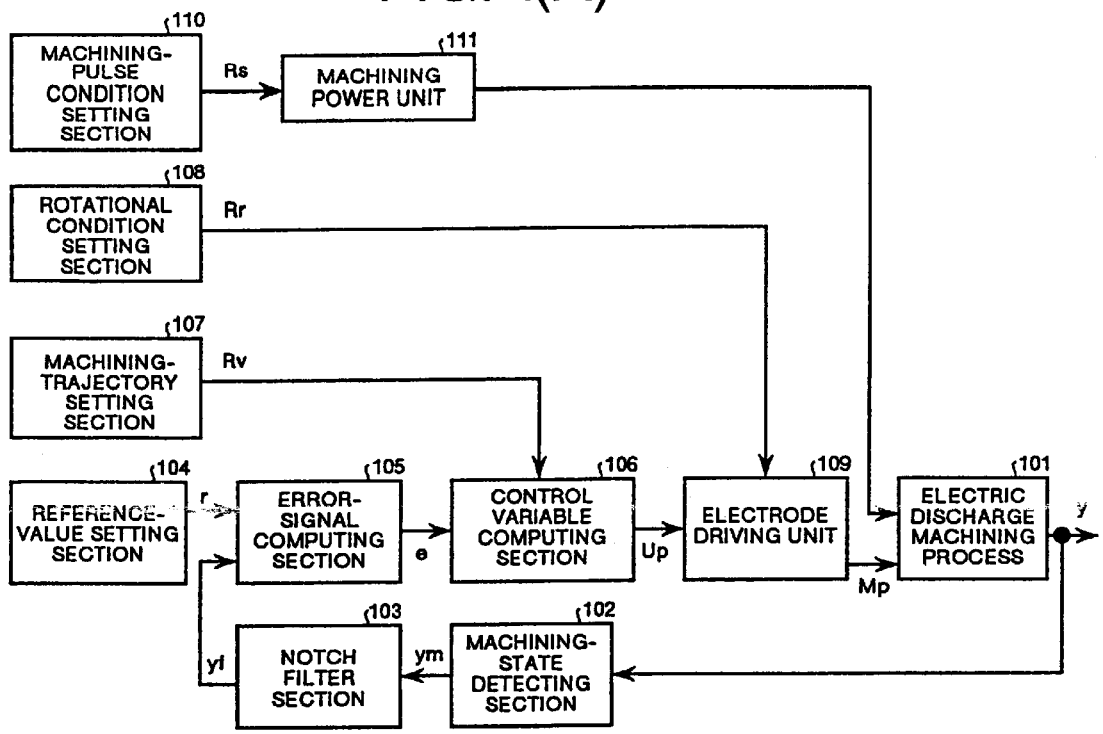
FIGS. 1(A) and 1(B) are, respectively, a block diagram showing an electric discharge machining control system and a diagram of movement of an electrode controlled by the system according to a first embodiment of the present invention.
Figure 1B:
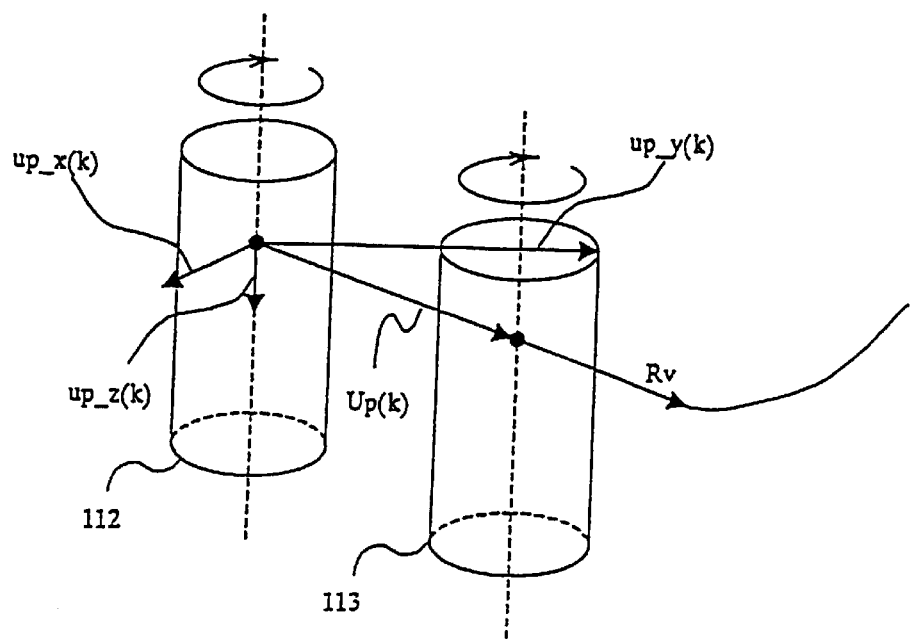
Figure 2A:
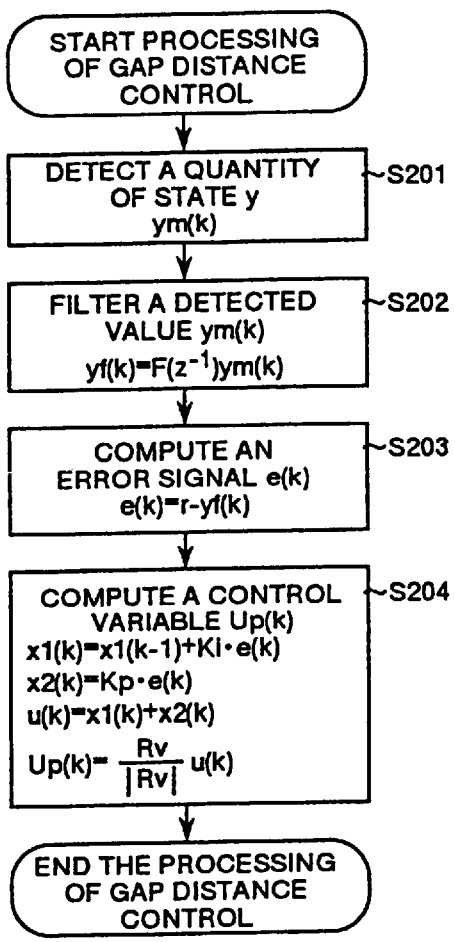
FIG. 2(A) is a flow chart showing operations of a gap distance control system shown in FIG. 1(A), FIG. 2(B) corresponds to FIG. 2(A) and shows a configuration with dedicated hardware.

FIG. 1 (A) shows an electric discharge machining control system according to a first embodiment of the present invention. In this figure, the reference numerals 101, 102, 104 to 111 are the same as those described in the example based on the conventional technology. Each meaning of a quantity of state y, a detected value ym, a reference value r of a machining state, an error signal e, a machining-trajectory instruction value Rv, a rotational condition instruction value Rr, a control variable Up, an electrode moving quantity Mp, a machining-pulse condition instruction value Rs, and a machining pulse quantity Ms is the same as that described in the example based on the conventional technology. The reference numeral 103 indicates a notch filter section, and the reference sign yf indicates a signal obtained by filtering a detected value ym in the notch filter section 103. FIG. 2(A) shows the operations of the gap distance control system shown in FIGS. 1(A) and 1(B). The figure shows software-processing on k-th time when a gap distance controlling algorithm is realized by a microcomputer. The processing in Step S201 is performed by the machining-state detecting section 102 and in this step a machining state of the electric discharge machining process as, for instance, an average gap voltage ym (k) is detected. The processing in Step S202 is performed by the notch filter section 103 and in this step the detected value ym (k) is filtered using a filter $F(z^{-1})$ to compute a signal yf (k). The filter $F(z^{-1})$ is formed with one or two or more of filters each possessing the notch filter property. The notching frequency of this filter corresponds to the rotational frequency of the electrode or the resonance frequency of the mechanical system of the XYZ-axial driving unit. The notching frequencies may correspond to two or more of, the rotational frequency of the electrode and the harmonic of the rotational frequency; the rotational frequency of the electrode and the resonance frequency of the mechanical system of the XYZ-axial driving unit; the rotational frequency of the electrode, harmonic of the rotational frequency, and the resonance frequency of the mechanical system of the XYZ-axial driving unit; and two or more of the resonance frequencies of the mechanical system of the XYZ-axial driving unit. The processing in Step S203 is performed by the error-signal computing section 105 and in this step an error signal e(k) is calculated from a reference value r of an average gap voltage and the filtered signal yf(k). The processing in Step S204 is performed by the control variable computing section 106 and in this step a signal u(k) is calculated by subjecting the error signal e (k) to integral & proportional compensation. Further, the control variable computing section 106 computes the control variable Up(k) by multiplying the signal u (k) by a machining-trajectory instruction value Rv set in the machining-trajectory setting section 107. Now, assuming that Up (k)=(up_x (k), up_y (k), up_z (k)) and Rv=(rv_x, rv_y, rv_z), a control variable Up (k) is computed using equations (1), (2), and (3) described below. The computed control variable Up (k) is given to the electrode driving unit 109. Wherein Kp is a proportional gain and Ki is an integral gain.

$$up\_x(k) = \frac{rv\_x}{|Rv|} u(k) \quad (1)$$

$$up\_y(k) = \frac{rv\_y}{|Rv|} u(k) \quad (2)$$

$$up\_z(k) = \frac{rv\_z}{|Rv|} u(k) \quad (3)$$

As described above, by filtering the detected value indicating a machining state, it is possible to suppress that eccentricity of an electrode, fluctuations in electric characteristics at feeding brush sections, and mechanical resonance of a driving unit act as disturbance to the gap distance control system.

Although the description above has been made for the case where the processing is executed with software, the configuration shown in FIG. 2(A) may be realized with a dedicated hardware.

Figure 2B:
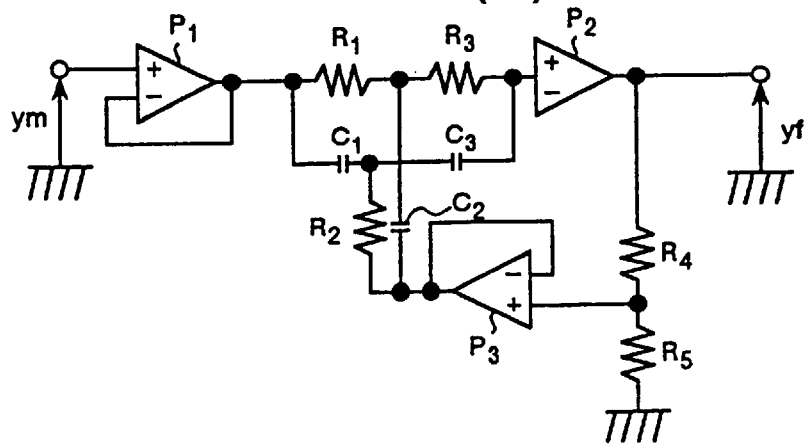

As shown in FIG. 2(B), designated at the reference numerals $P_1$ to $P_3$ are operational amplifiers. $R_1$ to $R_3$ are resistors. $C_1$ to $C_3$ are capacitors. These elements form a notch filter.

A notching frequency $f_N$ of the notch filter can be determined through the following equations (4) to (6).

$$R_1 = R_3 = 2R_2 \quad (4)$$

$$C_1 = C_3 = \frac{1}{4\pi f_N R_2} \quad (5)$$

$$2C_1 = C_2 \quad (6)$$

Where $$f_N = \frac{1}{2\pi C_1 R_1}$$

For example, when the electrode rotates at 1000 rpm, and settings are made as described below:

$C_1 = C_3 = 0.22$ μF, $C_2 = 2C_1 = 0.44$ μF, $R_1 = R_3 \approx 43.4$ KΩ, $R_2 = 1/2R_1 \approx 21.7$ KΩ a notching frequency becomes $f_N \approx 16.7$ Hz.

Second Embodiment

Figure 3:
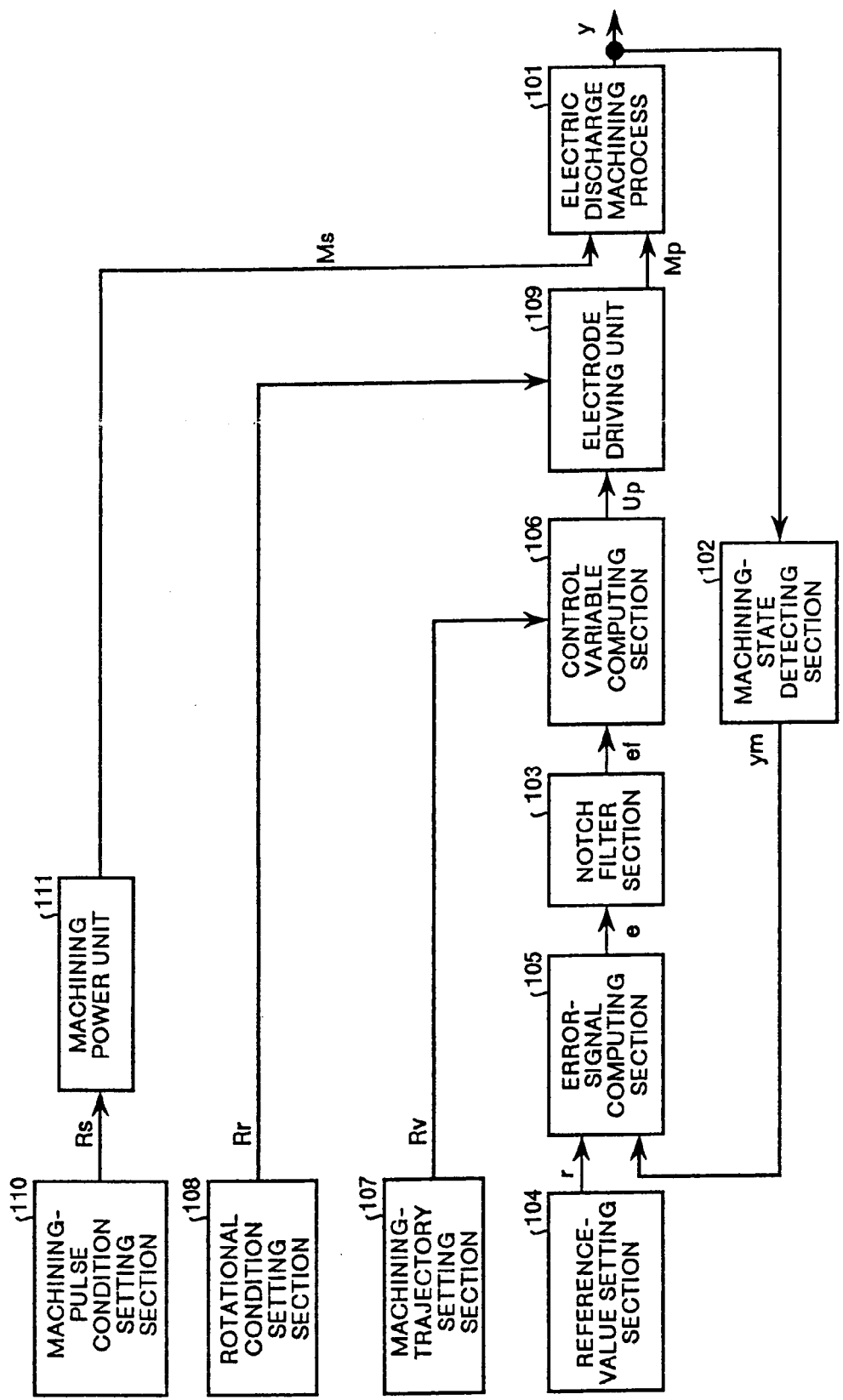
FIG. 3 is a block diagram showing an electric discharge machining control system according to a first embodiment of the present invention.
Figure 4:
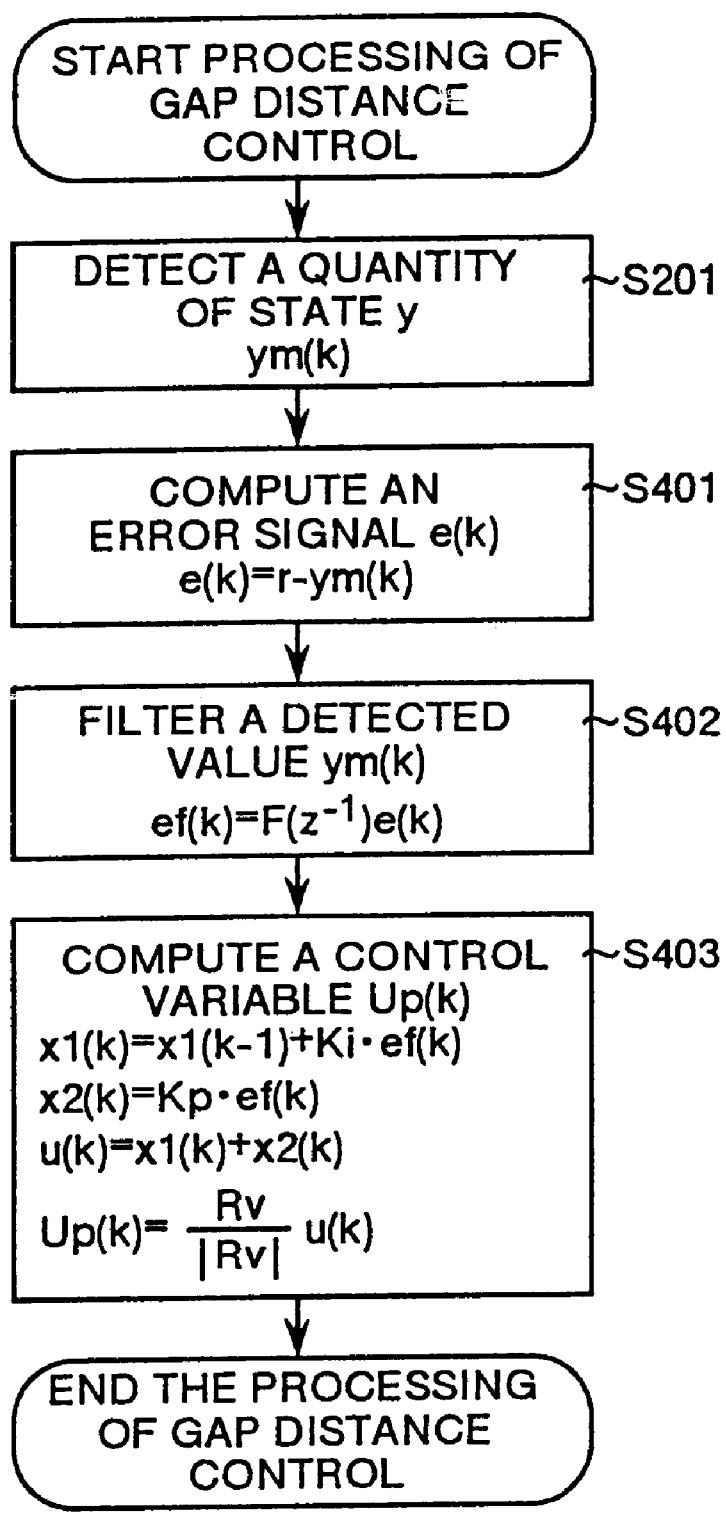
FIG. 4 is a flow chart showing operations of another gap distance control system shown in FIG. 3, FIG. 5 and FIG. 6 are flow charts each showing operations of another gap distance control system according to a second embodiment of the present invention.

FIG. 3 shows an electric discharge machining control system according to a second embodiment of the present invention. In the figure, the reference numerals 101 to 111 are the same as those described in the first embodiment of the present invention. Each meaning of a quantity of state y, a detected value ym, a reference value r of a machining state, an error signal e, a machining-trajectory instruction value Rv, a rotational condition instruction value Rr, a control variable Up, an electrode moving quantity Mp, a machining-pulse condition instruction value Rs, and a machining pulse quantity Ms is the same as that described in the first embodiment. The reference sign ef indicates a signal obtained by filtering an error signal e in the notch filter section 103. FIG. 4 shows the operations of the gap distance control system shown in FIG. 3. The figure shows software-processing on k-th time when a gap distance controlling algorithm is realized by a microcomputer. The processing in Step S201 is performed by the machining-state detecting section 102 and this step is the same as that described in the first embodiment. The processing in Step S401 is performed by the error-signal computing section 105 and in this step an error signal e is calculated from a reference value r of an average gap voltage and a detected value ym (k). The processing in Step S402 is performed by the notch filter section 103 and in this step the error signal e (k) is filtered by the filter $F(z^{-1})$ to compute a signal ef (k). The filter F $(z^{-1})$ is formed with one or two or more of filters each having a notch filter characteristic. The processing in Step S403 is performed by the control variable computing section 106 and in this step a signal u (k) calculated by giving integral & proportional compensation to the signal ef (k). Further, the control variable computing section 106 computes a control variable Up (k) by multiplying the signal u (k) by a machining-trajectory instruction value Rv set in the machining-trajectory setting section 107. Here, Kp is a proportional gain and Ki is an integral gain.

Figure 5:
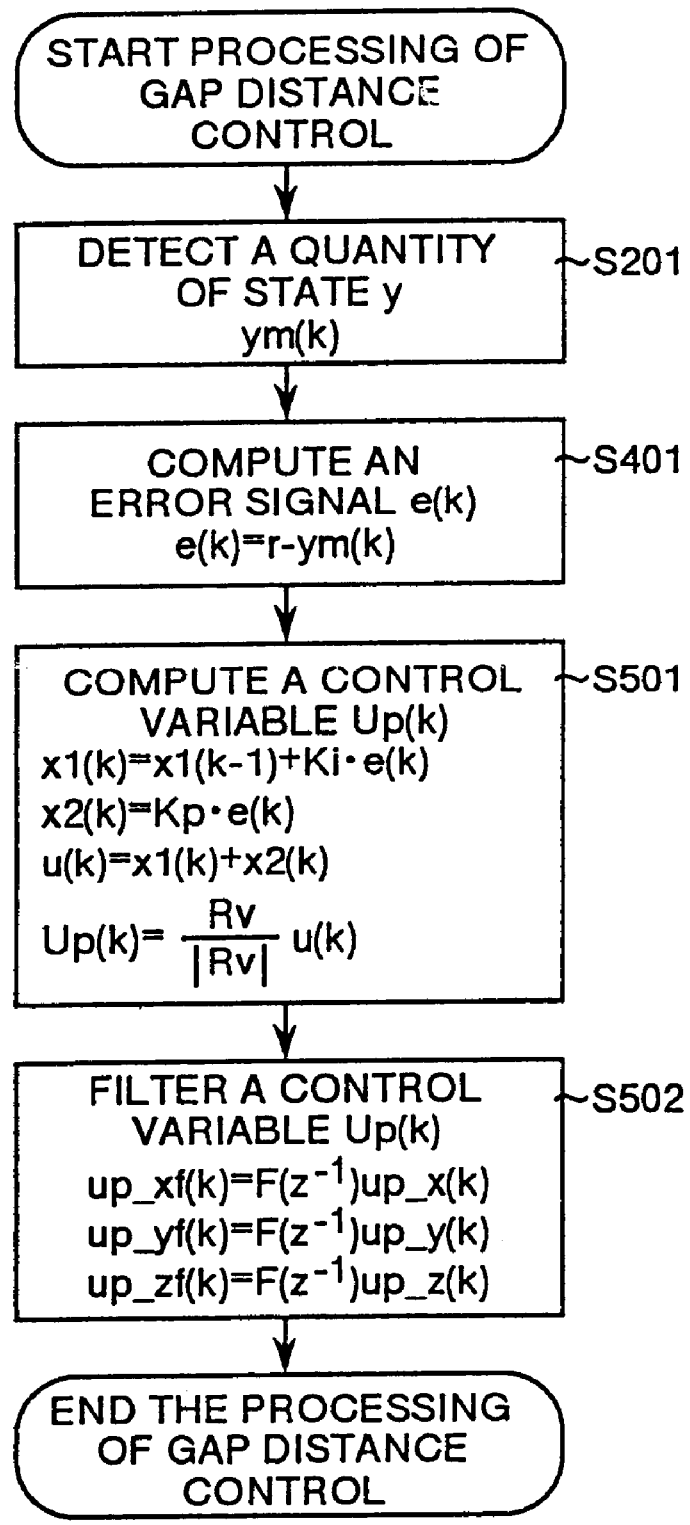

In the embodiment described above, a signal ef (k) is computed by filtering an error signal e (k) by the filter F $(z^{-1})$. However, in place of filtering the error signal e (k) each of the control variables of Up (k)=(up_x (k), up_y (k), up_z (k)) may be filtered after they are computed as shown in FIG. 5. Namely, as shown in S502, filtering is executed to the control variables up_x (k), up_y(k), and up_z (k), and the control variables up_xf (k), up_yf (k), and up_zf (k) are decided each as a control variable to the XYZ-axial driving unit. Herein, the filter F $(z^{-1})$ is formed with one or two or more of filters each having a notch filter characteristic.

Figure 6:
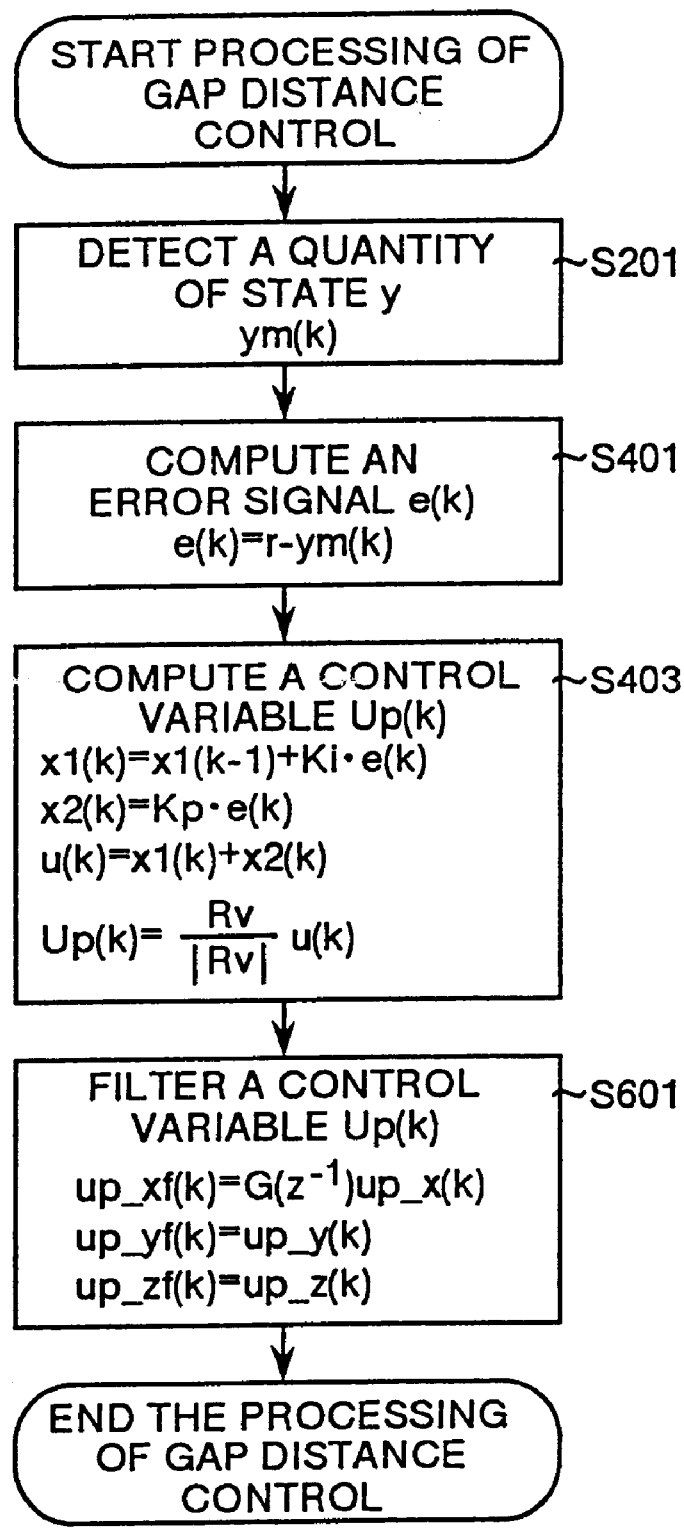

When a frequency of a notch filter in the notch filter section is a resonance frequency which the driving unit for an electrode or a workpiece has, it can filter only a control variable of the axis having the resonance after the control variable Up (k)=(up_x (k), up_y (k), up_z (k)) is computed, in place of filtering the error signal e (k). For example, S601 in FIG. 6 shows a case where there is resonance in the X-axial driving unit, in which filtering is executed to up_x (k), and up_xf (k) is decided as a control variable to the X-axial driving unit. Herein, the filter G $(z^{-1})$ is formed with one or two or more of filters each having a notch filter characteristic.

As described above, by filtering an error signal e (k) or a control variable Up (k), it becomes possible to suppress that eccentricity of an electrode, fluctuations in electric characteristics of feeding brush sections, and mechanical resonance of the driving unit act on the gap distance control system as disturbance. In addition, for mechanical resonance, filtering is executed only to a control variable of the axis having the resonance, so that it is possible to avoid unnecessary phase delay in gap distance control. This is advantageous in stability of the gap distance control system.

The description above has been made for the case that the processing is executed with software. However, it is also possible to compose of dedicated hardware.

Third Embodiment

Figure 7:
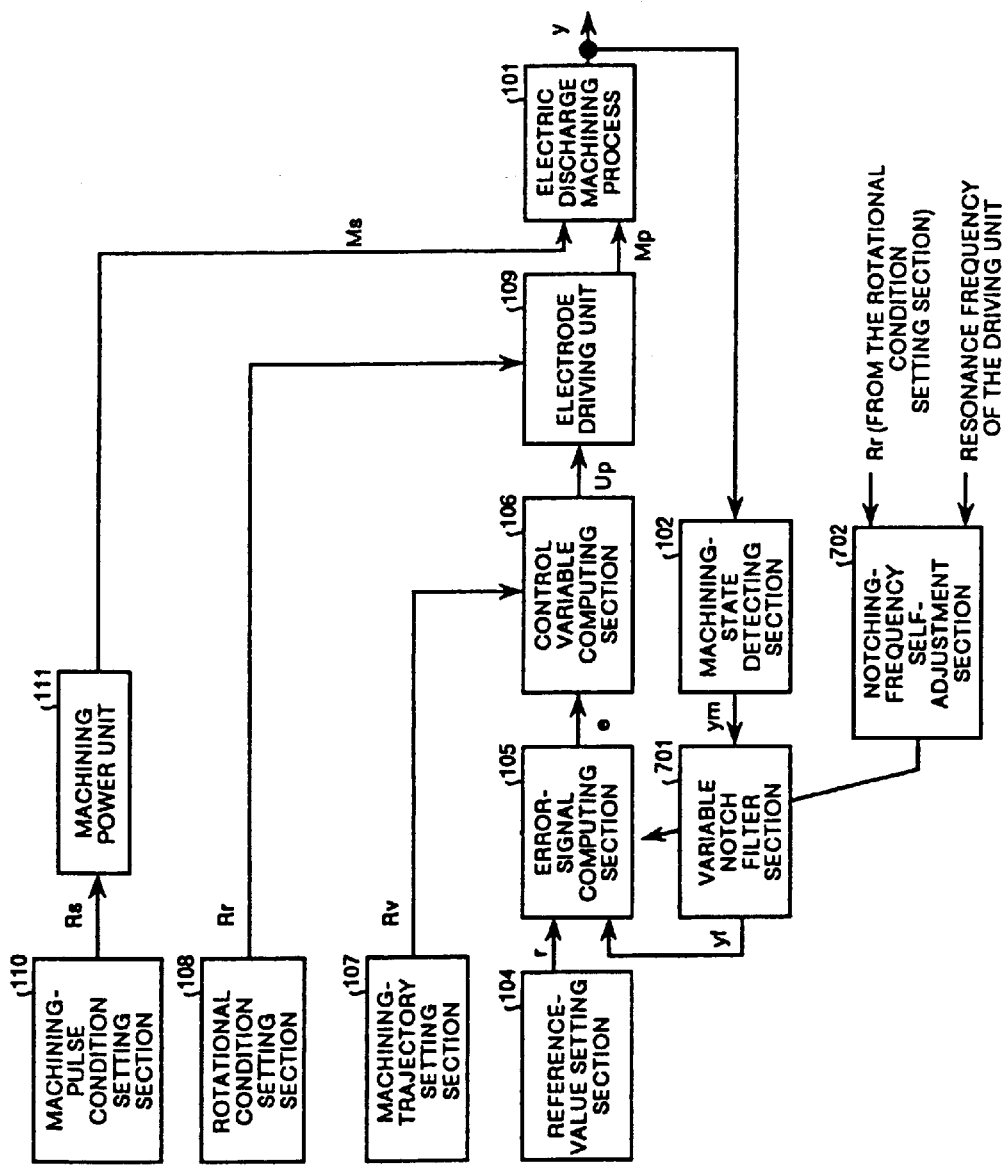
FIG. 7 is a block diagram showing an electric discharge machining control system according to a third embodiment of the present invention.
Figure 8:
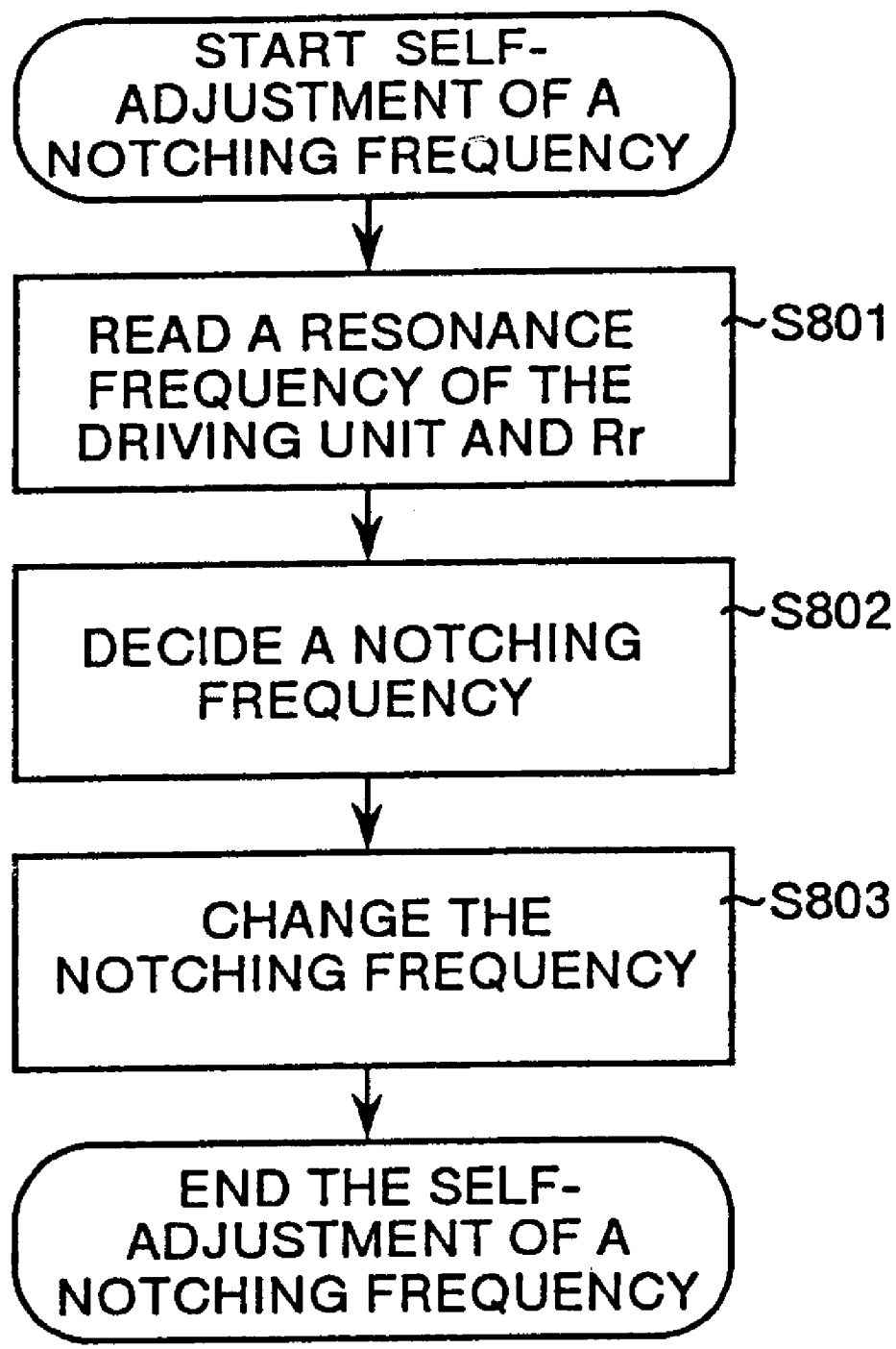
FIG. 8 is a view showing contents of operations for self-adjustment of a notching frequency according to the third embodiment of the present invention.

FIG. 7 shows an electric discharge machining control system according to a third embodiment. In this figure, the reference numerals 101, 102, and 104 to 111 are the same as those described in the first embodiment of the present invention. Each meaning of a quantity of state y, a detected value ym, a filtered signal yf, a reference value r of a machining state, an error signal e, a machining-trajectory instruction value Rv, a rotational condition instruction value Rr, a control variable Up, an electrode moving quantity Mp, a machining-pulse condition instruction value Rs, and a machining pulse quantity Ms is the same as that described in the first embodiment. The reference numeral 701 indicates a variable notch filter section, and the reference numeral 702 indicates a notching-frequency self adjustment section. The variable notch filter section 701 realizes a notch filter characteristic having a notching frequency computed by the notching-frequency self adjustment section 702, and computes a signal yf by filtering a detected value ym. FIG. 8 shows software-processing on k-th time in the variable notch filter section 701 and notching-frequency self-adjustment section 702. In S801, a rotational condition instruction value Rr set in the rotational condition setting section 108 and a resonance frequency examined beforehand that the driving unit has are read. In S802, a notching frequency is computed according to the read information. In S803, a notching frequency in the variable notch filter section is adjusted according to the notching frequency.

With the system configured as described above, even when the rotational condition or the like changes, a notching frequency can be adjusted corresponding to the change. Therefore, an appropriate filtering can be realized anytime.

Figure 9:
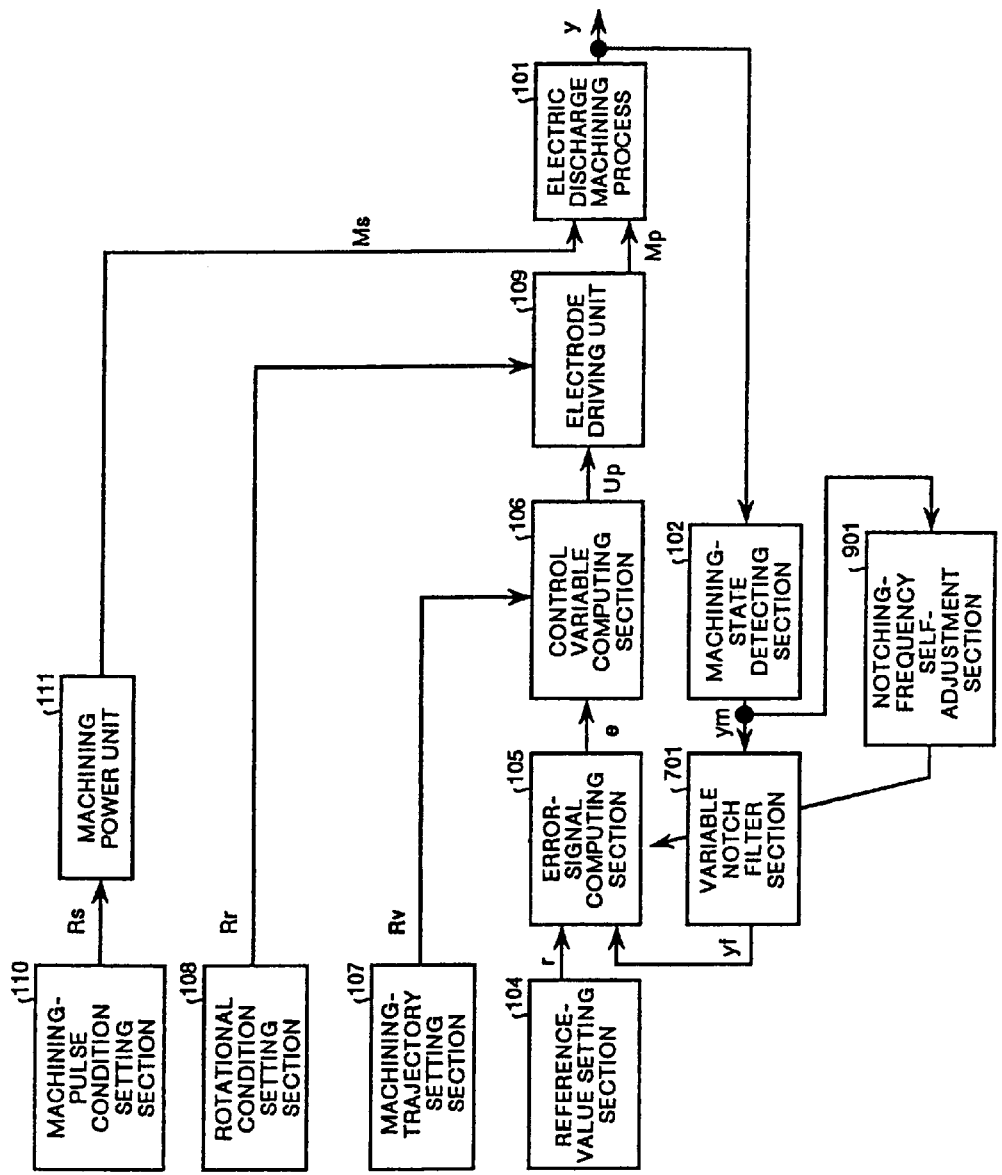
FIG. 9 is a block diagram showing operations of another gap distance control system according to the third embodiment of the present invention.
Figure 10:
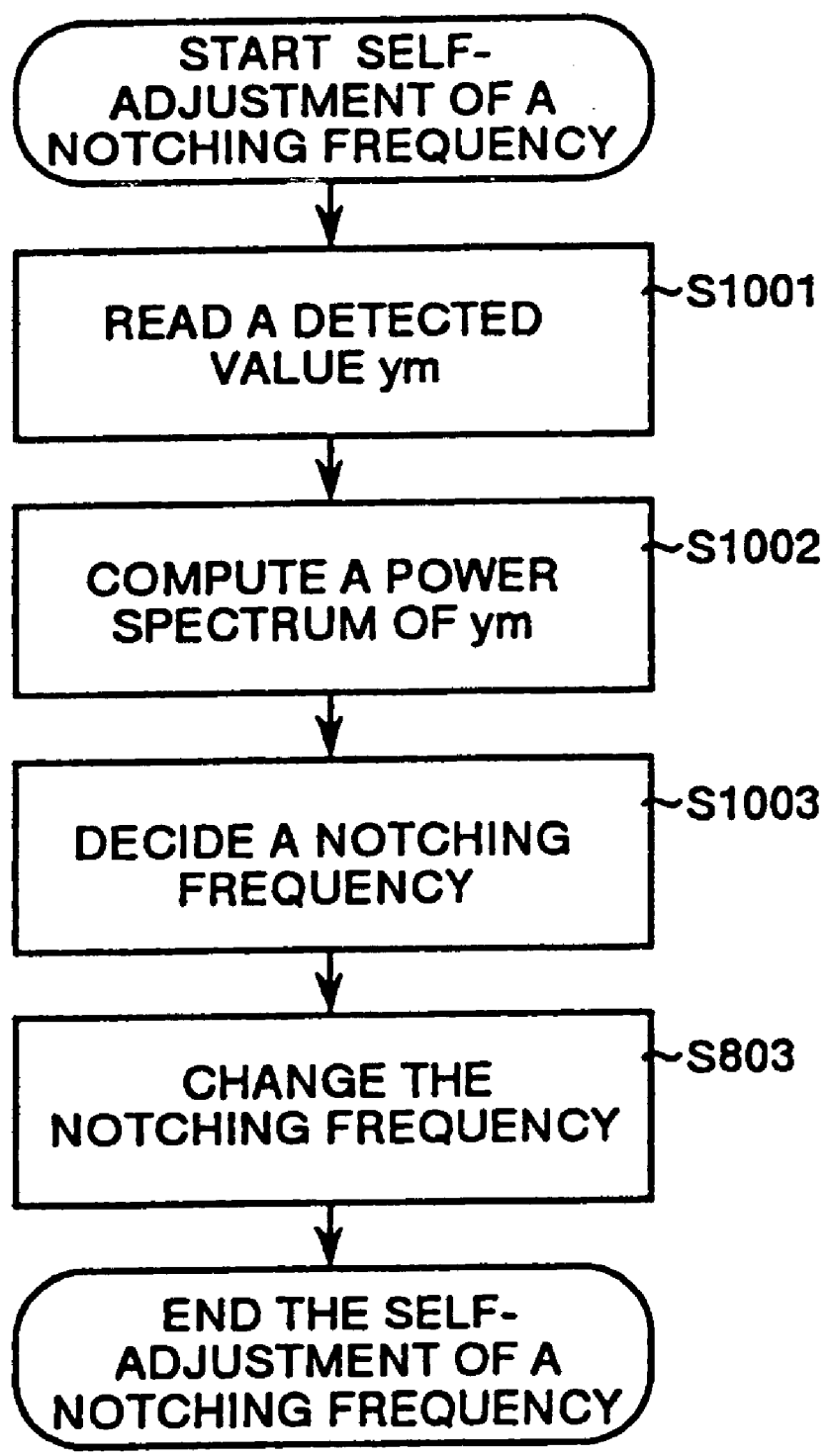
FIG. 10 is a view showing contents of operations for self-adjustment of a notching frequency according to the third embodiment of the present invention.

In the embodiment described above, the notching-frequency self-adjustment section 702 computes a notching frequency according to the rotational condition instruction value Rr set in the rotational condition setting section 108 and a resonance frequency examined beforehand that the driving unit has, and adjusts a notching frequency of the variable notch filter section. However, as shown in FIG. 9, a notching-frequency self-adjustment section 901 may comprise the steps of reading a detected value ym, computing a power spectrum of the detected value ym, determining a frequency with its peak in distribution of the power spectrum, and adjusting a notching frequency of the variable notch filter section according to the determined frequency. FIG. 10 shows software-processing on k-th time in the variable notch filter section 701 and notching-frequency self-adjustment section 901. In S1001, a detected value ym is read. In S1002, a power spectrum of the detected value ym is computed. In S1003, a frequency with its peak in the power spectrum is determined. In S803, the frequency in the variable notch filter section is adjusted according to the determined frequency as a notching frequency.

With the system configured as described above, a mechanical resonance frequency need not to be examined beforehand, and a rotational condition setting need not to be examined. Further, even when the frequency and the setting are changed, a notching frequency can automatically be adjusted corresponding to the change. Therefore, appropriate filtering can be realized anytime.

The description above has been made for the case where filtering is executed to a detected value ym. However, the same configuration can be made when filtering is executed to an error signal e as well as to a control variable for the driving unit.

It should be noted that the case of software-processing has been described above. However, it is also possible to compose of dedicated hardware.

Fourth Embodiment

Figure 11:
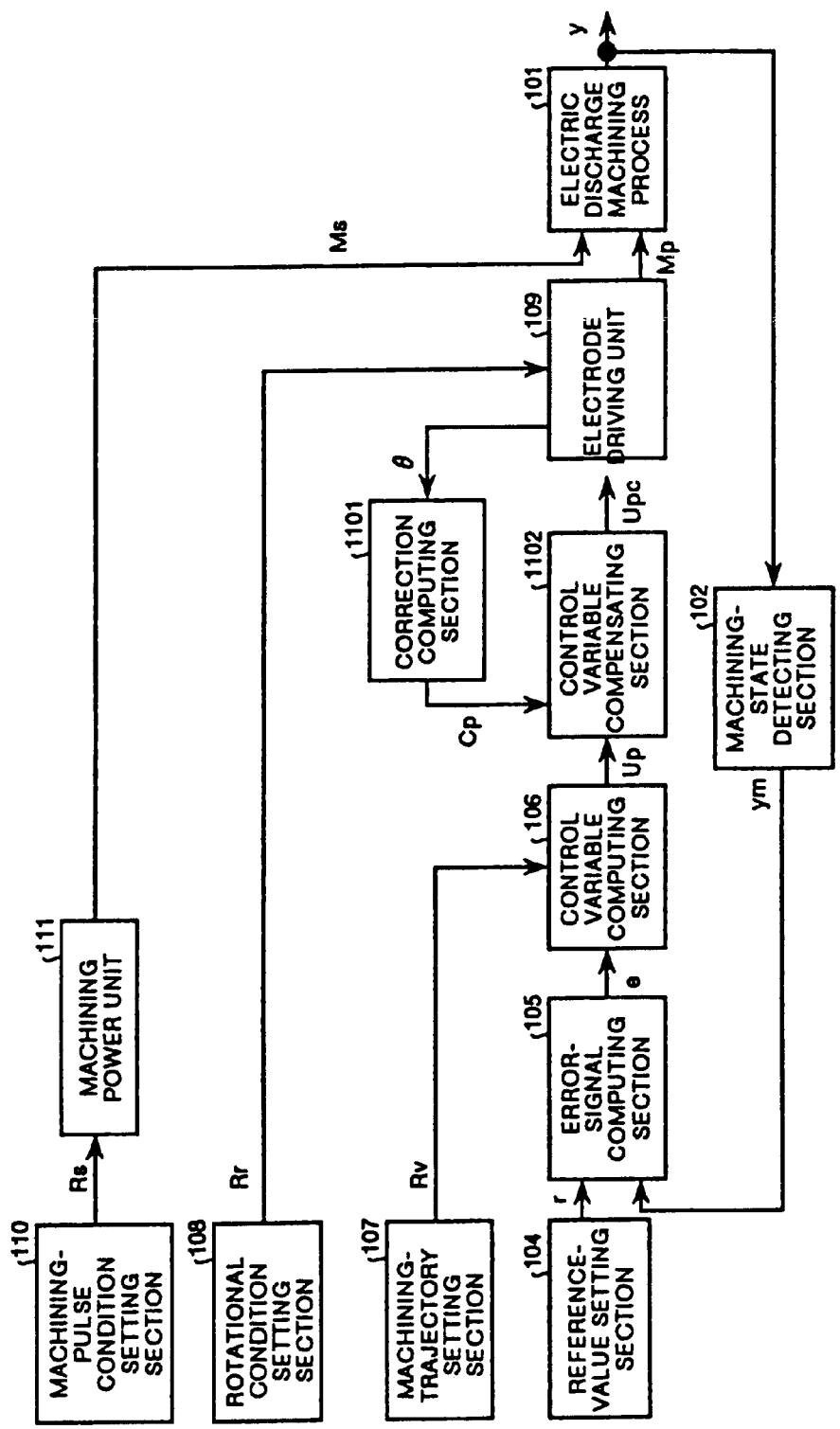
FIG. 11 is a block diagram showing an electric discharge machining control system according to a fourth embodiment of the present invention.

FIG. 11 shows an electric discharge machining control system according to a fourth embodiment of the present invention. In the figure, the reference numerals 101, 102, and 104 to 111 are the same as those described in the first embodiment of the present invention. Each meaning of a quantity of state y, a detected value ym, a reference value r of a machining state, an error signal e, a machining-trajectory instruction value Rv, a rotational condition instruction value Rr, a control variable Up, an electrode moving quantity Mp, a machining-pulse condition instruction value Rs, and a machining pulse quantity Ms is the same as that described in the first embodiment. The reference numeral 1101 indicates a correction computing section and 1102 indicates a control variable compensating section. The reference sign θ is an actual rotational angle of an electrode, Cp is a correction computed by the correction computing section 1101 based on the rotational angle θ, and Upc is a compensated control variable to the electrode driving unit 109 computed by compensating the control variable Up according to the correction Cp.

Figure 12:
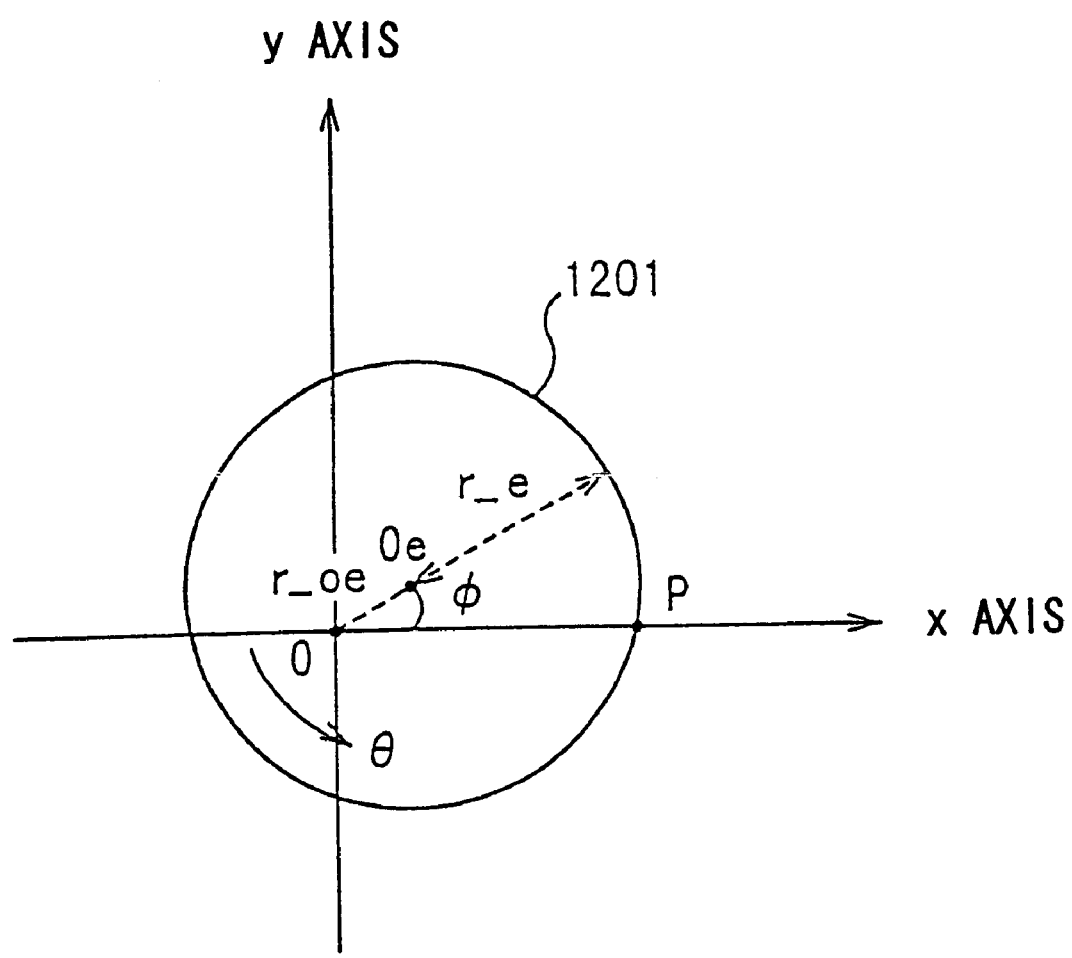
FIG. 12 is a view showing a case where a center of an electrode is different from a rotational center of the electrode according to the fourth embodiment of the present invention.
Figure 13:
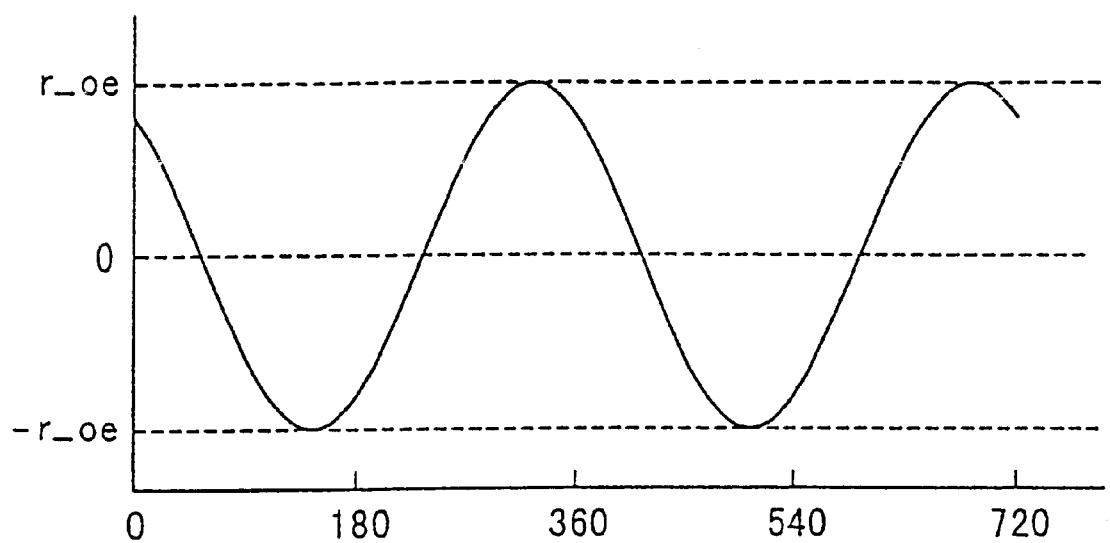
FIG. 13 is a view showing a state of eccentric observed when the electrode is rotated according to the fourth embodiment of the present invention.

Now, it is considered about the case where, in the machining while rotating a cylindrical electrode, a center of the electrode is different from a rotational center of the electrode. In FIG. 12, the reference numeral 1201 indicates a cylindrical electrode whose radius is r_e and whose center is Oe (x_Oe, y_Oe), which rotates around a rotational center O (0, 0). When the electrode is rotated twice and the eccentric situation is observed at a point of intersection P with X axis, the situation excluding a steady component becomes as shown in FIG. 13. In the figure, r_oe is a distance between the center of the electrode Oe and the rotational center C.

Figure 14:
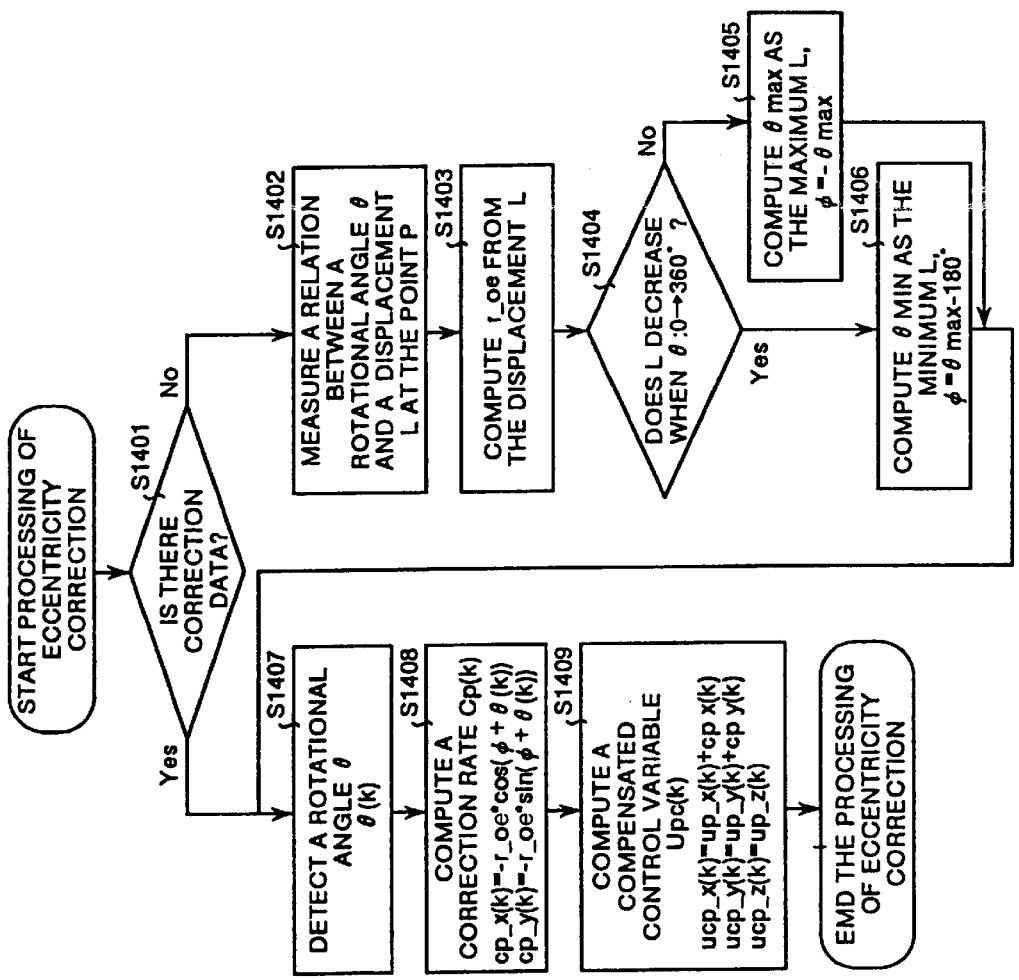
FIG. 14 is a flow chart showing software-processing on k-th time in the correction computing section and control variable compensating section in FIG. 11.

FIG. 14 shows software-processing on k-th time in the correction computing section 1101 and control variable compensating section 1102 in FIG. 11. In S1401, it is determined whether data for compensating eccentricity of the electrode have already available or not. When it is determined that correction data are not available, processing shifts to S1402. In S1402, a relation between a rotational angle θ of the electrode and a displacement L at the point P is measured. In S1403, r_oe is computed according to a result of measurement. In S1404, it is determined whether or not the displacement L first decreases when the electrode is rotated from 0 to 360°. When it is determined that the displacement L does not decrease, processing shifts to S1406. In S1405, a value θ max at the maximum displacement L is computed, and make φ=−θ max. On the other hand, when it is determined that the displacement L decreases, processing shifts to S1406. In S1406, a value θ min at the minimum displacement L is computed, and make φ=θ min=−180°. As described above, values r_oe and φ are computed. The processing is executed after the electrode is attached to the machine and before actual machining is executed. Accordingly, in S1401, during the machining it is determined that the section has data, processing shifts to S1407, and a rotational angle θ is detected. In S1408, a correction Cp=(cp_x (k), cp_y (k)) is computed from the detected rotational angle θ (k), r_oe, and φ. In S1409, a control variable Up is compensated according to the correction Cp to compute a compensated control variable Upc. The control variable Up is computed in the same method as the conventional example.

With the system configured as described above, actual eccentricity of the electrode can be measured, and the eccentricity can be compensated according to the measured value, only by changing signal processing for the conventional electrode driving unit. Therefore, a machining state during rotation of an electrode can be stabilized.

It should be noted that the way to compute r_oe and φ is not limited to the description above, the same compensation for eccentricity of an electrode is thus possible even if computation is performed in another method.

In the embodiment described above, data for compensation for eccentricity has been computed by using r_oe and φ through the equation. However, a data table for compensating eccentricity is configured from measured data shown in FIG. 13 and a compensated control variable Upc may be computed by using an actual rotational angle θ of the electrode and the data table.

Fifth Embodiment

Figure 15:
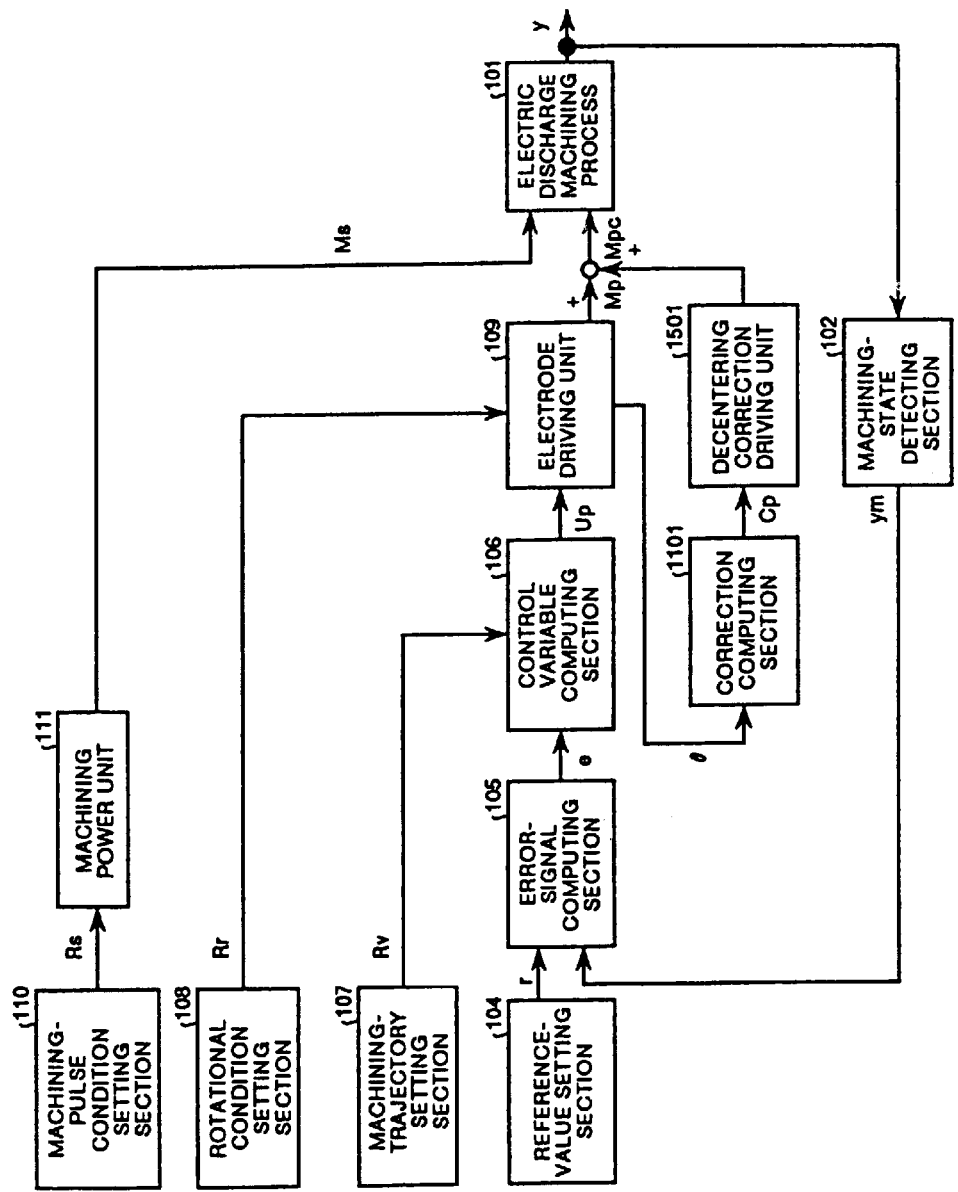
FIG. 15 is a block diagram showing an electric discharge machining control system according to a fifth embodiment of the present invention.
Figure 16:
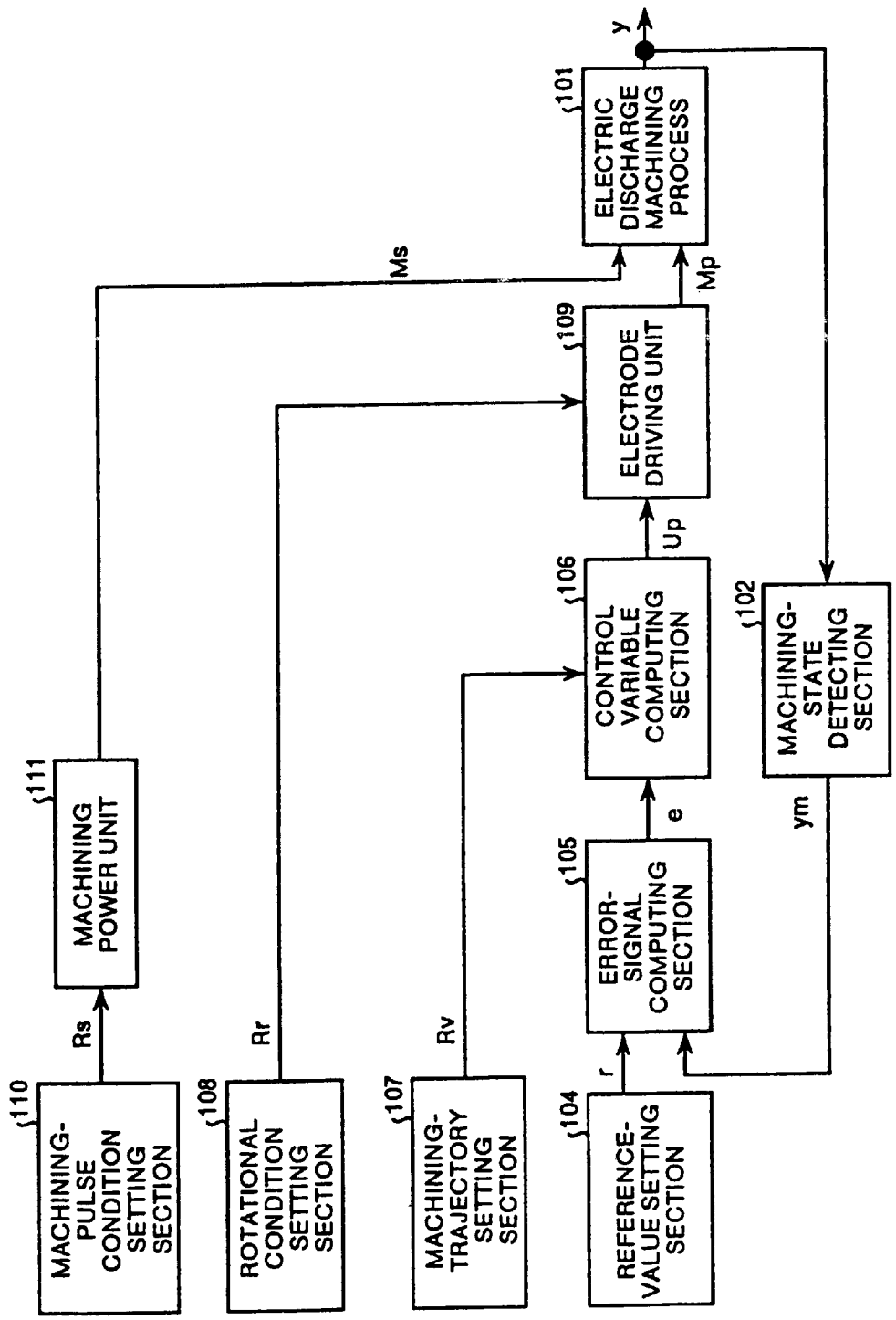
FIG. 16 is a block diagram showing a configuration of a machining control system including a conventional type of gap distance control system.
Figure 17:
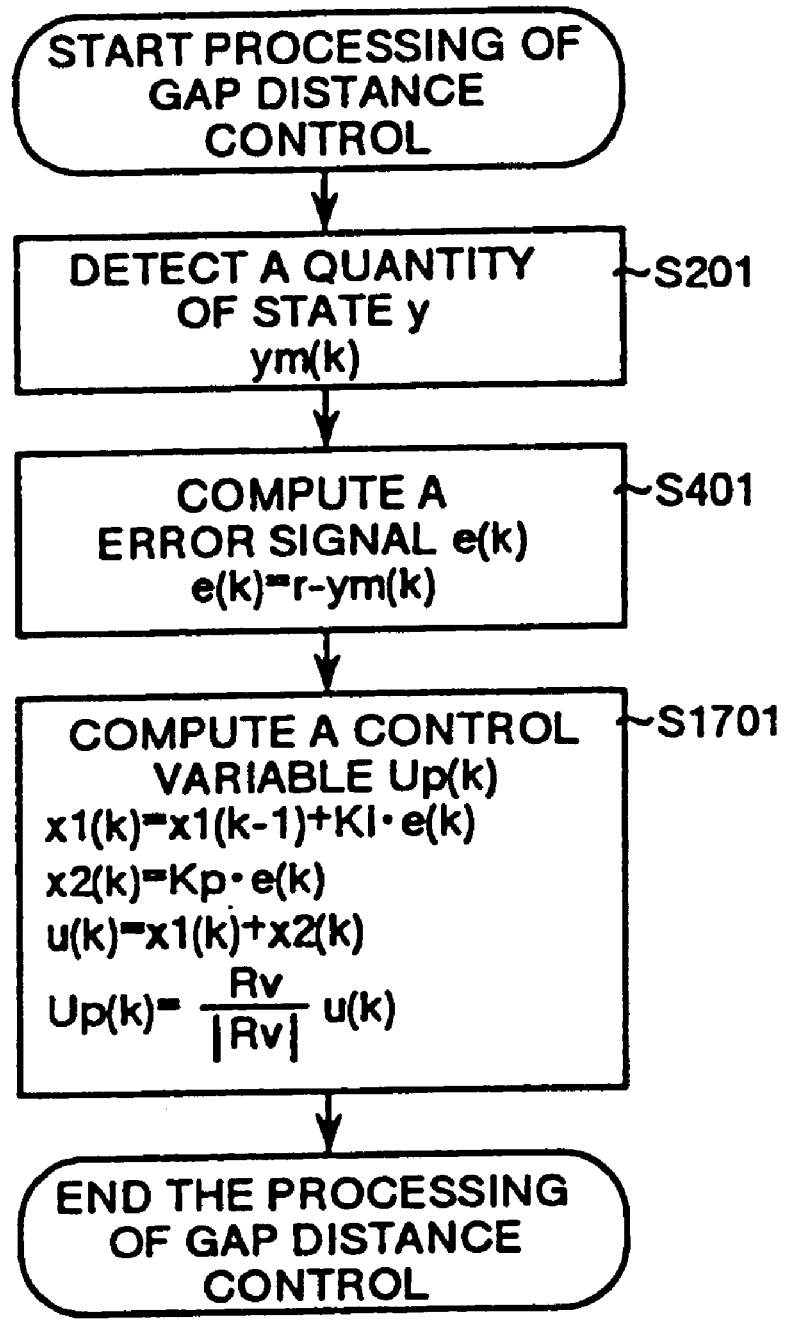
FIG. 17 is a flow chart showing operations of the conventional type of gap distance control system.
Figure 18:
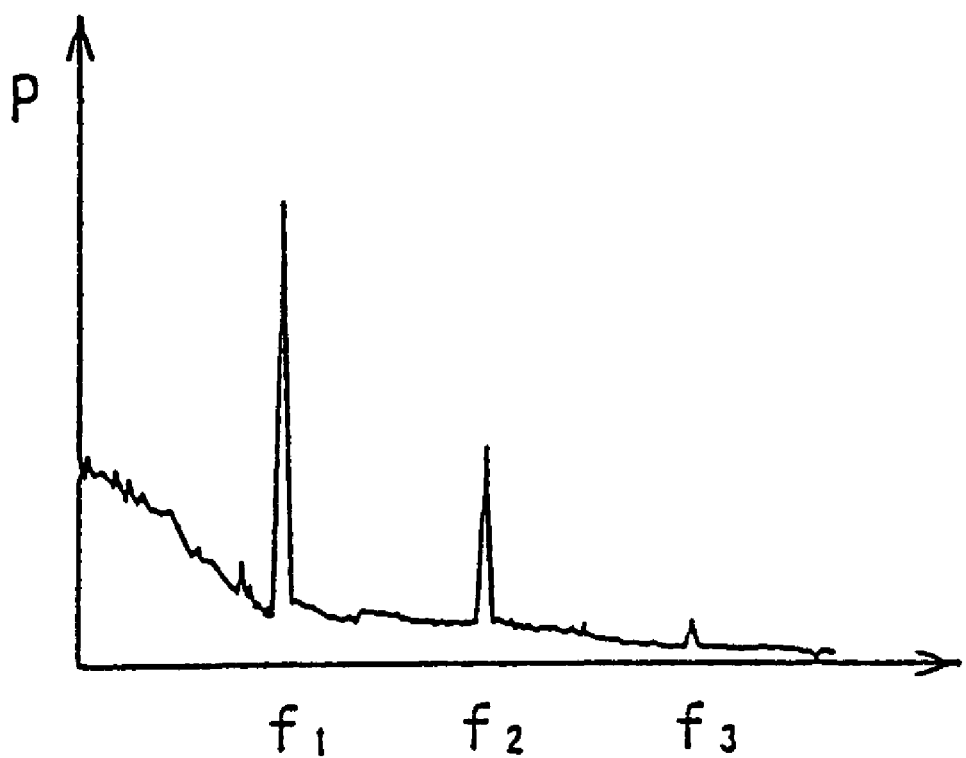
FIG. 18 is a view showing a state of a power spectrum of a machining-state detected value in the conventional type of gap distance control system.
Figure 19:
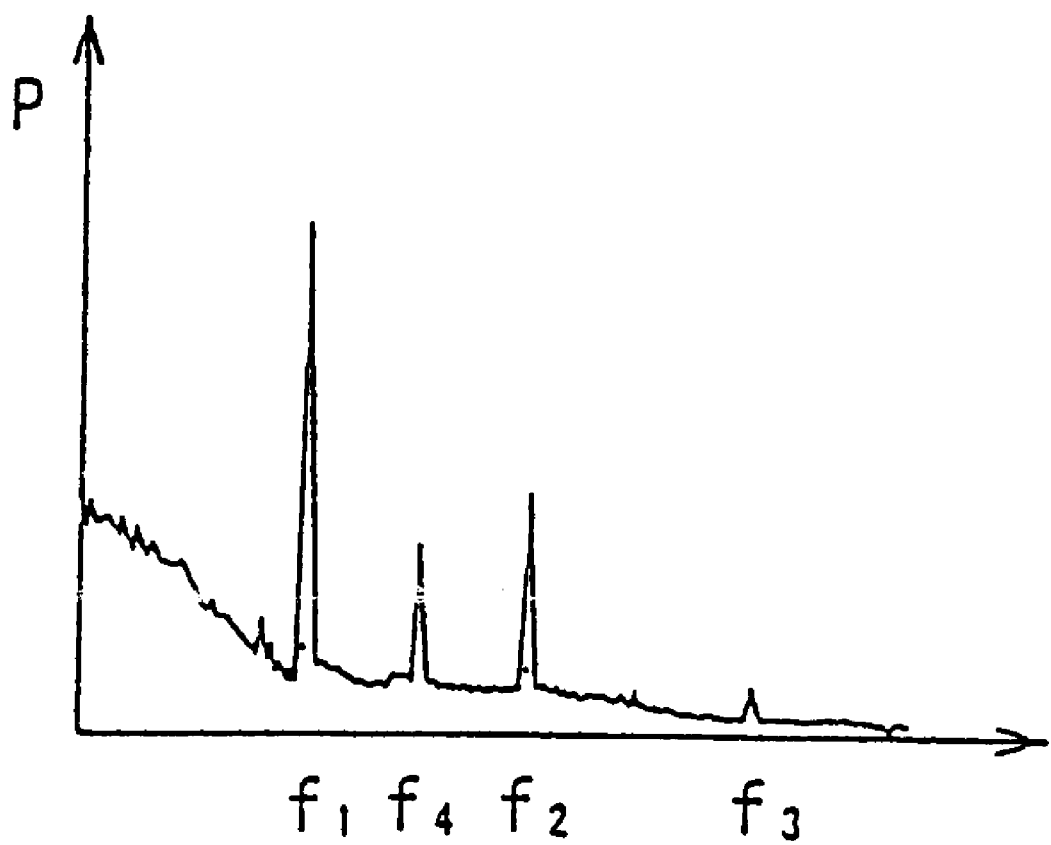
FIG. 19 is a view showing a state of a power spectrum of a machining-state detected value in another electric discharge machine using the conventional type of gap distance control system.

FIG. 15 shows an electric discharge machining control system according to a fifth embodiment of the present invention. In the figure, the reference numerals 101, 102, and 104 to 111 are the same as those described in the first embodiment of the present invention, and the reference numeral 1101 is the same as that shown in the fourth embodiment of the present invention. Each meaning of a quantity of state y, a detected value ym, a reference value r of a machining state, an error signal e, a machining-trajectory instruction value Rv, a rotational condition instruction value Rr, a control variable Up, an electrode moving quantity Mp, a machining-pulse condition instruction value Rs, and a machining pulse quantity Ms is the same as that described in the first embodiment, and each meaning of a rotational angle θ of an electrode and a correction Cp is the same as that described in the fourth embodiment of the present invention. The reference numeral 1501 indicates an eccentricity-compensation driving unit, and a compensated electrode moving quantity Mpc is obtained by adding a correction to an electrode moving quantity Mp by the electrode driving unit 109.

Description is made for operations hereinafter. The correction computing section 1101, the same as the fourth embodiment computes the correction Cp, and the correction is given to the eccentricity-compensation driving unit 1501 as a control variable. That is, besides by the electrode driving unit 109, the eccentricity of the electrode is compensated by the eccentricity-compensation driving unit 1501 which is capable to drive the electrode in the XY-axial direction within a comparatively minute range.

In the conventional type of an electrode driving unit, a quick response is difficult because a driving range of an electrode is larger. However, in the eccentricity-compensation driving unit, the driving range is minute, and a quick response can easily be realized. Accordingly, with the system configured as described above, it is possible to accurately compensate eccentricity of an electrode even when the electrode is rotated at high speed. In addition, as signal processing only for compensation of eccentricity may be executed independently from the signal processing in the conventional type of gap distance control system, the whole system can be realized comparatively easily.

In the embodiment described above, the eccentricity-compensation driving unit has been made to a unit capable of driving an electrode in the XY-axial direction by a comparatively minute range. However, even when coordinate axes of the eccentricity-compensation driving unit are different from those of the electrode driving unit, eccentricity of an electrode can be compensated without any trouble by transforming a correction Cp according to a coordinate relation between these driving units.

Industrial Applicability

The present invention is applied to an electric discharge machining device, which is effective in improving a machining speed based on achievement in stability of machining by suppressing disturbance to a gap distance control system due to eccentric of an electrode as well as due to mechanical resonance of an electrode driving system.

We claim:

1. An electric discharge machining control method in which an electrode and a workpiece have a specific distance between them in a machining liquid, a voltage is applied between the electrode and the workpiece, and the workpiece is machined with a generated electric discharge, said method comprising:

detecting a machining state;

filtering a detected value, indicating the machining state, with a notch filter having a notching frequency corresponding to one of a rotational frequency of an electrode and a mechanical resonance of a driving system for moving and rotating the electrode;

computing an error signal from an output value obtained by the filtering and a set value of a machining state;

computing a control variable, for controlling movement of the electrode, from the error signal and a set movement value of the electrode; and moving the electrode in a specific direction and, at the same time, rotating the electrode about an axis perpendicular an opposite surface of the workpiece, according to the control variable.

2. The electric discharge machining control method according to claim 1 including adjusting the notching frequency according to one of the rotational frequency of the electrode and the mechanical resonance of the driving system for moving and rotating the electrode.

3. An electric discharge machining control method in which an electrode and a workpiece have a specific distance between them in a machining liquid, a voltage is applied between the electrode and the workpiece, and the workpiece is machined with a generated electric discharge, said method comprising:

detecting a machining state;

computing an error signal from a detected value indicating the machining state and a set value of a machining state;

computing a control variables, for controlling movement of the electrodes, from the error signal and a set movement value of the electrode;

computing a correction for reducing an eccentricity of the electrode;

compensating the control variable according to the correction; and moving the electrode in a specific direction and, at the same times, rotating the electrode about an axis perpendicular an opposite surface of the workpiece according to the compensated control variable.

4. An electric discharge machining control device in which an electrode and a workpiece have a specific distance between them in a machining liquid, a voltage is applied between the electrode and the workpiece, and the workpiece is machined with a generated electric discharge, said device comprising:

a machining-state detecting section for detecting a machining state;

a notch filter section for filtering a detected value in the machining-state detecting section, the notch filter section having a notching frequency corresponding to one of a rotational frequency of an electrode and a mechanical resonance frequency of a driving system for moving and rotating the electrode;

an error-signal computing section for computing an error signal from an output value of the notch filter section and a set value of a machining state;

a control variable computing section for computing a control variable, for controlling movement of the electrode, from the error signal and a set movement value of the electrode; and an electrode driving unit section for moving the electrode in a specific direction and, at the same time, rotating the electrode about an axis perpendicular an opposite surface of the workpiece according to the control variable output from the control variable computing section.

5. The electric discharge machining control device according to claim 4 further comprising a notching-frequency self adjustment section for adjusting the notching frequency according to one of the rotational frequency of an electrode and the mechanical resonance frequency of the driving system for moving and rotating the electrode.

6. An electric discharge machining control device in which an electrode and a workpiece have a specific distance between them in a machining liquid, a voltage is applied between the electrode and the workpiece, and the workpiece is machined with a generated electric discharge, said device comprising:

a machining-state detecting section for detecting a machining state;

an error-signal computing section for computing an error signal from a detected value in the machining-state detecting section and a set value of a machining state;

a control variable computing section for computing a control variable, for controlling movement of the electrodes, from the error signal and a set movement value of the electrode;

a correction computing section for computing a correction for reducing an eccentricity of the electrode;

a control variable compensating section for compensating the control variable from the control variable computing section according to the correction from the correction computing section to produce a compensated control variable; and an electrode driving unit section for moving the electrode in a specific direction and, at the same times, rotating the electrode about an axis perpendicular an opposite surface of the workpiece according to the compensated control variable.

7. An electric discharge machining control method in which an electrode and a workpiece have a specific distance between them in a machining liquid, a voltage is applied between the electrode and the workpiece, and the workpiece is machined with a generated electric discharge, said method comprising:

detecting a machining state;

computing an error signal from a detected value obtained by the detecting and a set value of a machining state;

filtering the error signal with a notch filter having a notching frequency;

computing a control variable, for controlling movement of the electrode, from the error signal obtained by the filtering and a set movement value of the electrode; and moving the electrode in a specific direction and, at the same time, rotating the electrode about an axis perpendicular an opposite surface of the workpiece, according to the control variable.

8. An electric discharge machining control device in which an electrode and a workpiece have a specific distance between them in a machining liquid, a voltage is applied between the electrode and the workpiece, and the workpiece is machined with a generated electric discharge, said device comprising:

a machining-state detecting section for detecting a machining state;

an error-signal computing section for computing an error signal from a detected value detected by the machining-state detecting section and a set value of a machining state;

a notch filter section having a notching frequency for filtering the error signal;

a control variable computing section for computing a control variable, for controlling movement of the electrode, from the error signal filtered by the notch filter section and a set movement value of the electrode; and an electrode driving unit for moving the electrode in a specific direction and, at the same time, rotating the electrode about an axis perpendicular an opposite surface of the workpiece, according to the control variable.

9. An electric discharge machining control method in which an electrode and a workpiece have a specific distance between them in a machining liquid, a voltage is applied between the electrode and the workpiece, and the workpiece is machined with a generated electric discharge, said method comprising:

detecting a machining state;

computing an error signal from a detected value obtained by the detecting and a set value of a machining state;

computing a control variable, for controlling movement of the electrode, from the error signal and a set movement value of the electrode; and filtering the control variable with a notch filter having a notching frequency;

moving the electrode in a specific direction and, at the same time, rotating the electrode about an axis perpendicular an opposite surface of the workpiece, according to the control variable obtained by the filtering.

10. An electric discharge machining control method in which an electrode and a workpiece have a specific distance between them in a machining liquid, a voltage is applied between the electrode and the workpiece, and the workpiece is machined with a generated electric discharge, said method comprising:

detecting a machining state;

computing an error signal from a detected value obtained by the detecting and a set value of a machining state;

computing a control variable, for controlling movement of the electrode, from the error signal and a set movement value of the electrode;

computing a correction for reducing effects of eccentricity of the electrode;

moving the electrode in a specific direction and, at the same time, rotating the electrode about an axis perpendicular an opposite surface of the workpiece, according to the control variable and the correction.

11. An electric discharge machining control device in which an electrode and a workpiece have a specific distance between them in a machining liquid, a voltage is applied between the electrode and the workpiece, and the workpiece is machined with a generated electric discharge, said device comprising:

a machining-state detecting section for detecting a machining state;

an error-signal computing section for computing an error signal from a detected value detected by the machining-state detecting section and a set value of a machining state;

a control variable computing section for computing a control variable for controlling movement of the electrode, from the error signal and a set movement value of the electrode;

an electrode driving unit for moving the electrode in a specific direction and, at the same time, rotating the electrode about an axis perpendicular an opposite surface of the workpiece, according to the control variable;

a correction computing section for computing a correction for reducing effects of eccentricity of the electrode; and a correction driving unit for moving the electrode, according to the correction.

* * * * *

UNITED STATES PATENT AND TRADEMARK OFFICE
CERTIFICATE OF CORRECTION

PATENT NO. : 6,505,091 B1
DATED : January 7, 2003
INVENTOR(S) : Imai et al.

It is certified that error appears in the above-identified patent and that said Letters Patent is hereby corrected as shown below:

<u>Title page,</u>
Item [22], change "PCT Filed: Nov. 5, 1999" to -- PCT Filed: May 11, 1999 --

Signed and Sealed this

Fifth Day of August, 2003

JAMES E. ROGAN
*Director of the United States Patent and Trademark Office*